No. 759,172. Patented May 3, 1904.

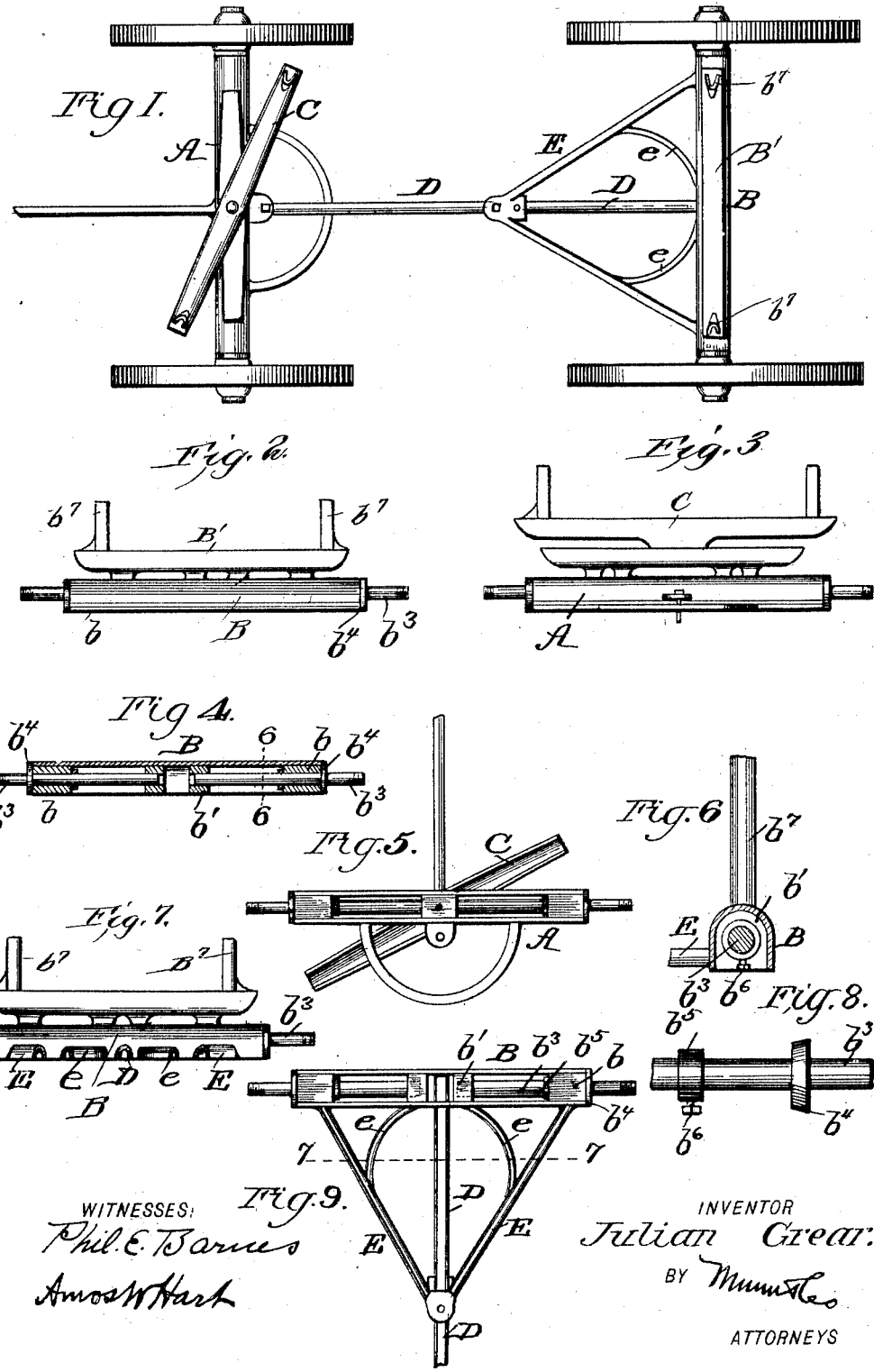

UNITED STATES PATENT OFFICE.

JULIAN GREAR, OF PADUCAH, KENTUCKY, ASSIGNOR OF ONE-HALF TO HENRY F. KOLB, OF PADUCAH, KENTUCKY.

RUNNING-GEAR FOR WAGONS.

SPECIFICATION forming part of Letters Patent No. 759,172, dated May 3, 1904.

Application filed January 14, 1904. Serial No. 188,981. (No model.)

*To all whom it may concern:*

Be it known that I, JULIAN GREAR, a citizen of the United States, residing at Paducah, in the county of McCracken and the State of Kentucky, have made certain new and useful Improvements in Running-Gear for Wagons, of which the following is a specification.

My invention is an improvement in the axles and connected part of the frame of running-gear for wagons and carriages, the objects being increased lightness, durability, strength, and economy of manufacture.

The details of construction, arrangement, and combination of parts are as hereinafter described, and illustrated in accompanying drawings, in which—

Figure 1 is a top plan view of a running-gear embodying my invention. Fig. 2 is a side view of the rear axle. Fig. 3 is a side view of the front axle with bolster. Fig. 4 is a longitudinal section of the rear axle. Fig. 5 is a bottom plan view of the front axle with bolster. Fig. 6 is an enlarged transverse section on the line 6 6 of Fig. 4. Fig. 7 is a cross-section on the line 7 7 of Fig. 9. Fig. 8 is an enlarged side view of a portion of one of the detachable axle-journals. Fig. 9 is a bottom plan view of the rear axle and a portion of the frame connected therewith.

The front and rear axles A B are shown in Fig. 1 provided with wheels; but the latter form no part of my invention. Each of the axles A B comprises three parts. I will first describe the rear axle illustrated in Figs. 2, 4, 6, 7, and 8. The body of the axle is formed of plate metal struck up so as to present a U form in cross-section. In other words, the body is grooved from one end to the other. Adjacent to each end of the body of the axle is arranged a bearing-block $b$, and at a point removed therefrom is another bearing-block $b'$. (See Fig. 4.) These are brazed to the body of the axle. The axle journal $b^3$ (see particularly Fig. 8) is inserted and held in coincident bores formed in the blocks $b\ b'$. The journal is provided with a fixed collar $b^4$ and a movable collar $b^5$, the latter being secured by a clamp-screw $b^6$. The fixed collar $b^4$ abuts the end of the body of the axle and the outer bearing-block $b$, while the movable collar works in contact with the inner end of the bearing-block $b$, as will be understood by reference to Fig. 4. The collar $b^4$ is forged in one piece with the journal $b^3$, and the outer end of the latter is reduced and screw-threaded to provide for attachment of a nut by which a wheel is secured thereon. It will be seen that by removing the collar $b^5$ the axle-journal $b^3$ may be inserted in the bearings $b\ b'$, the collar $b^5$ being also applied at the same time, and then clamped by the screw $b^6$. The journals $b^3$ are thus free to rotate in the bearings $b\ b'$, but may be readily detached whenever required.

The construction of the front axle proper and the construction of the journals therefor and their attachment to the body of the axle being practically the same as in the case of the rear axles, special description thereof is not necessary.

The rear axle B is provided with a bolster B', having standards $b^7$, which are practically grooved bars and brazed to the body of the axle. The front bolster C (see Figs. 1, 3, and 5) is similarly constructed as a grooved bar and provided with standards in the same manner as the rear axle.

The two axles A B are connected by a perch or reach D and hounds E, as shown in Fig. 1. (See also Fig. 9.) The perch D is constructed similarly to the axles—that is to say, of sheet or plate metal struck up and having a longitudinal groove. The same is adapted to slide in the block connected with the hounds proper at their junction, as shown in Fig. 1, and a pin is employed for locking the perch to the hounds. The hounds are constructed in the same manner as the bodies of the axle and the perch, the same being grooved on the under side, and the curved braces $e$, which connect the hounds proper with the body of the axle, are also similarly constructed. (See Fig. 7.) It will be understood that the parts E $e$ are brazed together and to the body of the axle and that the parts E are similarly brazed to the block through which the perch passes.

In manufacture of my invention the several parts, save the blocks that constitute the bearings and the journals proper, are struck up from sheet or plate metal by means of suitable dies and are thus very cheaply produced.

Having thus described my invention, what I claim as new, and desire to secure by Letters Patent, is—

1. The improved wagon-axle comprising a metal body grooved throughout its length and having two journal-boxes arranged therein in each end portion, the said boxes being brazed and thus forming permanent attachments of the axle proper, as shown and described.

2. The combination, with the grooved metal axle and journal-boxes arranged and secured therein, thus forming a permanent attachment, of the removable journals having a cylindrical body held in bearings in the said boxes and provided with a fixed collar exterior to the axle proper, and a removable and adjustable collar applied to the inner portion of the journal and arranged in contact with the outer journal-box, and means for clamping the said movable collar, the latter being made of such diameter that it may be drawn off over the inner end of the journal, substantially as described.

JULIAN GREAR.

Witnesses:
W. M. REED,
E. W. BRADY.